United States Patent
Nadarajah et al.

(10) Patent No.: US 10,642,963 B2
(45) Date of Patent: May 5, 2020

(54) DIGITAL RIGHTS MANAGEMENT FOR A GPU

(71) Applicant: ATI Technologies ULC, Markham (CA)

(72) Inventors: Kathirkamanathan Nadarajah, Richmond Hill (CA); Randall Brown, Toronto (CA); Sergey Blotsky, Etobicoke (CA); Xing Yue Zhang, Markham (CA)

(73) Assignee: ATI Technologies ULC, Markham (CA)

( * ) Notice: Subject to any disclaimer, the term of this patent is extended or adjusted under 35 U.S.C. 154(b) by 240 days.

(21) Appl. No.: 15/373,214

(22) Filed: Dec. 8, 2016

(65) Prior Publication Data

US 2018/0165426 A1 Jun. 14, 2018

(51) Int. Cl.
*G06F 21/10* (2013.01)

(52) U.S. Cl.
CPC .................... *G06F 21/10* (2013.01)

(58) Field of Classification Search
CPC ...... G06F 21/10; G06F 21/6209; G06F 21/71; G06F 2221/0742
See application file for complete search history.

(56) References Cited

U.S. PATENT DOCUMENTS

| | | | |
|---|---|---|---|
| 7,627,747 B2 | 12/2009 | Eckhardt et al. | |
| 8,311,222 B2 | 11/2012 | Rawson, Sr. | |
| 8,424,099 B2 * | 4/2013 | Fahrny | G06F 21/10 380/200 |
| 9,225,520 B2 * | 12/2015 | Lorberbaum | H04L 9/0861 |
| 2008/0301415 A1 * | 12/2008 | Maeda | G06F 9/455 712/225 |
| 2012/0317036 A1 * | 12/2012 | Bower | G06Q 20/02 705/75 |
| 2013/0254117 A1 * | 9/2013 | von Mueller | G06Q 20/3829 705/71 |
| 2014/0122902 A1 * | 5/2014 | Isozaki | G06F 12/1408 713/193 |
| 2017/0201503 A1 * | 7/2017 | Jayasena | G06F 12/1408 |
| 2017/0288865 A1 * | 10/2017 | Amidei | H04L 9/0819 |
| 2018/0046823 A1 * | 2/2018 | Durham | G06F 21/53 |
| 2018/0144754 A1 | 5/2018 | Peng | |

* cited by examiner

*Primary Examiner* — David Le
(74) *Attorney, Agent, or Firm* — Kowert Hood Munyon Rankin and Goetzel PC; Rory D. Rankin

(57) ABSTRACT

Systems, apparatuses, and methods for implementing digital rights management using a GPU are disclosed. In one embodiment, a system includes at least a GPU, a security processor, and a memory. The GPU is configured to execute a first portion of a binary and detect that a second portion of the binary is encrypted. The second portion of the binary includes enhanced content that is available for purchase. If the user purchases the enhanced content, a license server generates a token specific to the security processor of the system and conveys the token to the system. Next, the security processor decrypts the second portion of the binary using the token and stores the decrypted second portion of the binary at a memory location accessible by the first processor. Then, the first processor executes the second portion of the binary.

20 Claims, 6 Drawing Sheets

DIGITAL RIGHTS MANAGEMENT FOR A GPU

BACKGROUND

Description of the Related Art

Digital rights management (DRM) techniques are important for companies seeking to protect their proprietary content from unauthorized usage. Generally speaking, DRM refers to managing and controlling access to digital content. As used herein, "content" is defined as any data that can be presented to a user and which can include images, videos, audio, documents, video games, graphics, textures, and other data. Companies spend considerable resources developing specialized content. For the development of a video game, enhanced content can be created which includes high resolution textures to improve the user experience. It can be challenging to prevent an unauthorized user from accessing the enhanced content while simultaneously allowing a user who has acquired the necessary rights access to the enhanced content. Accordingly, improved DRM techniques are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
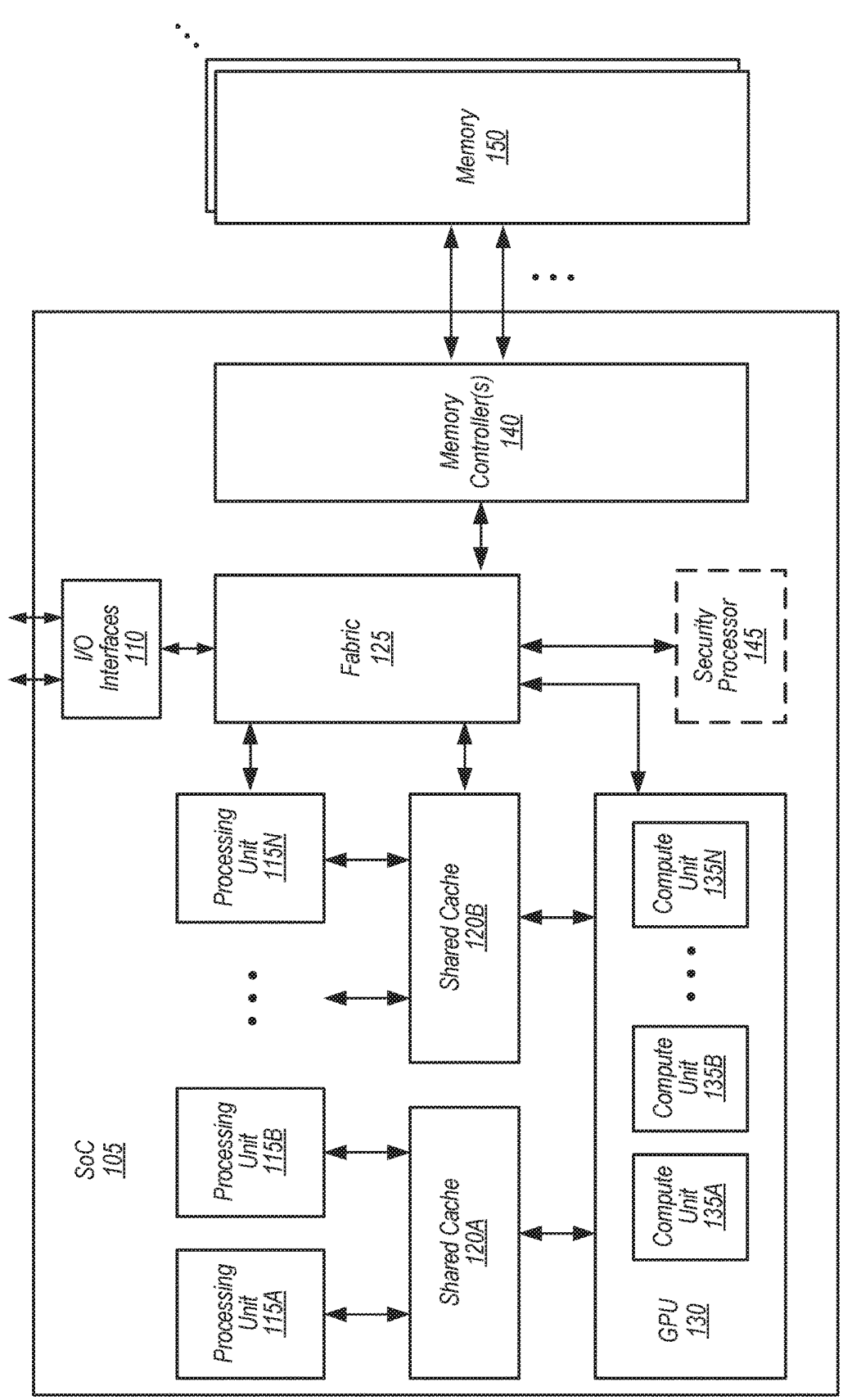
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing digital rights management for a graphics processing unit (GPU) are disclosed. In one embodiment, a system includes at least a first processor, a second processor, and a memory. In one embodiment, the first processor is a GPU and the second processor is a security processor. In some cases, the security processor is located within the GPU. In one embodiment, the system executes a first portion of a binary on the first processor. Additionally, the system detects that a second portion of the binary is encrypted. In one embodiment, the rights to access the second portion of the binary are represented as a token. In various embodiments, a token may be any data the represents credentials required for providing access to some restricted content or functionality. Accordingly, in this embodiment, the system retrieves a token from a license server, where the token is generated so that it is usable only by the second processor on the requesting system. The second processor decrypts the second portion of the binary using the token. In one embodiment, the first processor conveys an address to the second processor, with the address specifying a memory location where the decrypted second portion is to be stored. Next, the second processor decrypts the second portion of the binary and stores the decrypted second portion in the specified location. Then, the first processor executes the second portion of the binary.

If the second processor does not have a token for decrypting the second portion of the binary, then the first processor executes a third portion of the binary in place of the second portion. In one embodiment, the second portion of the binary includes a first plurality of textures and the third portion of the binary includes a second plurality of textures, where the first plurality of textures are at a higher resolution than the second plurality of textures. For example, in one embodiment, the binary is a game, and if the user of the system purchases the token for decrypting the second portion of the binary, then the game includes enhanced content (e.g., higher quality graphics). If the user of the system does not purchase the token, then the user can still play the game but with lower quality graphics (i.e., the second plurality of textures).

In one embodiment, a company or organization initiates the development of proprietary content. For example, in one embodiment, a game developer initiates the creation of a new video game. Next, a computing system encrypts preliminary releases of binaries which include the proprietary content. Then, the system generates tokens for decrypting the binaries, wherein the tokens are only functional on specific physical machines. For example, in one embodiment, the tokens are generated for computers and servers that are located within a company's local network. In one embodiment, each of these computers and servers includes a security processor, and the tokens are generated to work only with these specific security processors. Accordingly, the tokens for decrypting the binaries prevent the binaries from being executed on computers external to the company and prevent leakage of information associated with any pre-release binaries. The company can then perform pre-release testing of the binaries by decrypting the binaries on these approved machines without the risk of content being exposed outside of the company.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit 130, security processor 145, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs. In one embodiment, processing units 115A-N are configured to convey binaries to GPU 130 for execution by GPU 130.

GPU 130 includes compute units 135A-N which are representative of any number and type of compute units that may be used for graphics or general-purpose processing. GPU 130 is coupled to shared caches 120A-B and fabric 125. In one embodiment, GPU 130 is configured to execute a first portion of a binary while detecting that a second portion of the binary is encrypted. GPU 130 sends a request for security processor 145 to decrypt the second portion of the binary. GPU 130 can also send a memory address to the security processor 145 to specify where the decrypted second portion of the binary should be stored. In one embodiment, the second portion of the binary includes enhanced content (e.g., high resolution textures). If security processor 145 does not have the token required for decrypting the second portion of the binary, GPU 130 executes a third portion of the binary in place of the second portion. The third portion of the binary includes regular content (e.g., low resolution textures) which can be utilized by customers who do not purchase the enhanced content. It is noted that a binary can also be referred to as an "executable binary" herein. In one embodiment, a binary is defined as a plurality of executable instructions targeted to a given processor (e.g., GPU 130).

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

In one embodiment, security processor 145 is configured to control the digital rights management and other security functions of system 100. In various embodiments, security processor 145 is preloaded with any number of public/private encryption keys and/or generates any number and type of encryption keys. As used herein, the term "security processor" is defined as an apparatus configured to execute instructions for performing authentication, validation, encryption, and/or decryption functions for system 100. A processing unit 115A-N is differentiated from a security processor, with the processing unit executing operating system instructions, user application instructions, etc. An additional differentiating factor between a main processor and security processor 145 is that security processor 145 includes one or more security-related mechanisms (e.g., random number generator, cryptographic coprocessor). Also, security processor 145 stores one or more unique encryption/decryption keys inaccessible to the rest of system 100. Accordingly, security processor 145 provides a hardware-based root of trust for system 100.

In one embodiment, security processor 145 is located external to GPU 130. In another embodiment, security processor 145 is located within GPU 130. In other embodiments, security processor 145 is incorporated within other components. In one embodiment, security processor 145 is configured to decrypt portions of executable binaries to enable GPU 130 to execute these portions of the binaries. For example, a binary being executed by GPU 130 includes one or more encrypted portions. The encrypted portions correspond to enhanced content that can be purchased to enhance the user experience of the binary being executed by GPU 130. For example, the enhanced content can include high resolution textures, extra levels within a game, or other content. If the user purchases this enhanced content, system 100 can login to a license server (not shown) for retrieving a token to enable security processor 145 to decrypt the encrypted portions of the binary. In one embodiment, the license server generates a token for use by only security processor 145 so that only system 100 can decrypt the encrypted portions of content. In this embodiment, security processor 145 conveys a secure value to the license server, and the license server utilizes the secure value to generate the token for decrypting the enhanced content.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 135A-N. In some embodiments, SoC 105 includes shared caches 120A-B that are utilized by processing units 115A-N and compute units 135A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
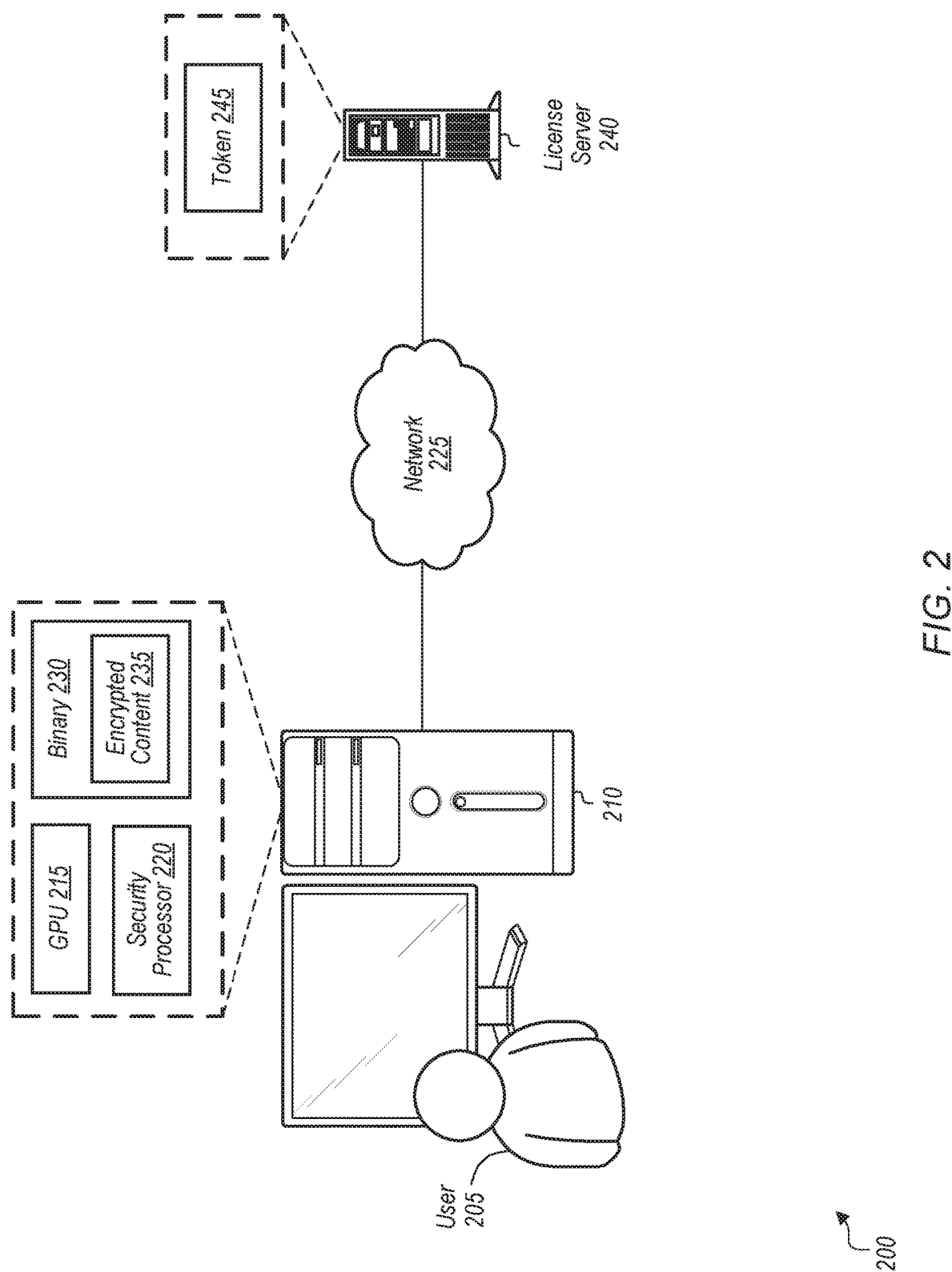
FIG. 2 is a block diagram of one embodiment of a system that implements digital rights management using a GPU.

Turning now to FIG. 2, a block diagram of one embodiment of a system 200 that implements digital rights management using a GPU is shown. Computer 210 includes at least GPU 215, security processor 220, and binary 230 with encrypted content 235. While computer 210 is shown as a desktop computer in FIG. 2, it should be understood that computer 210 is representative of any type of computer or computing device. In other embodiments, computer 210 can be a laptop, server, mobile device, or other system or device with at least one processor, one or more memory devices, a network interface, and a display device.

When binary 230 is executed on GPU 215, GPU 215 is only able to execute the unencrypted portions of binary 230 prior to receiving a token which allows encrypted content 235 to be decrypted and executed by GPU 215. If the user 205 desires to purchase a token 245 for decrypting encrypted content 235, the user 205 on computer 210 connects to license server 240 over network 225. Network 225 can be any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 225 can further include remote direct memory access (RDMA) hardware and/or software, transmission control protocol/internet protocol (TCP/IP) hardware and/or software, router, repeaters, switches, grids, and/or others.

In one embodiment, the user provides payment information and a value cryptographically linked to security processor 220 to license server 240. License server 240 utilizes the value cryptographically linked to security processor 220 to generate token 245 for decrypting encrypted content 235. Token 245 is generated to work only with security processor 220 of computer 210. License server 240 conveys token 245 to computer 210 via network 225, and then security processor 220 utilizes token 245 to decrypt encrypted content 235 of binary 230. In one embodiment, security processor 220 utilizes token 245 to generate a key, and then security processor 220 decrypts encrypted content 235 using the key. Then, GPU 215 is able to execute the decrypted content 235. In one embodiment, the content 235 includes enhanced content such as high resolution textures which create an improved user experience when GPU 215 executes binary 230. It is noted that computer 210 can disconnect from network 225 after receiving token 245 and operate in an "offline" manner. When computer 210 is disconnected from network 225, computer 210 is still able to utilize token 245 to decrypt the encrypted content 235.

Figure 3:
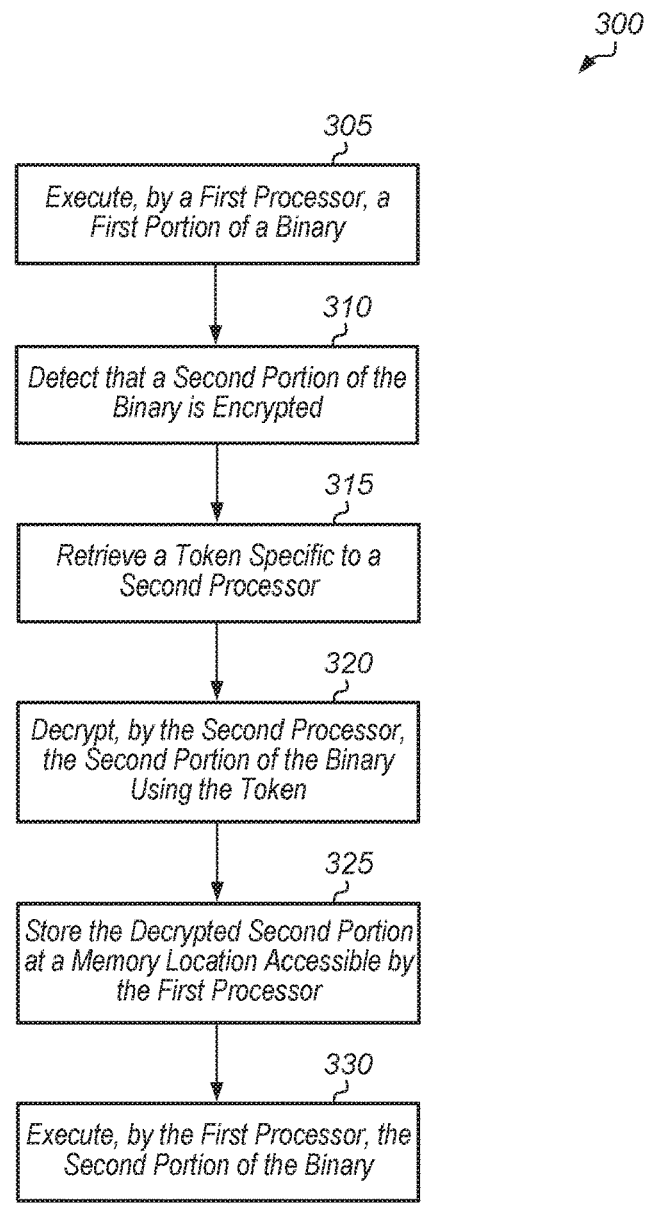
FIG. 3 is a generalized flow diagram illustrating one embodiment of a method for implementing digital rights management using a GPU.
Figure 4:
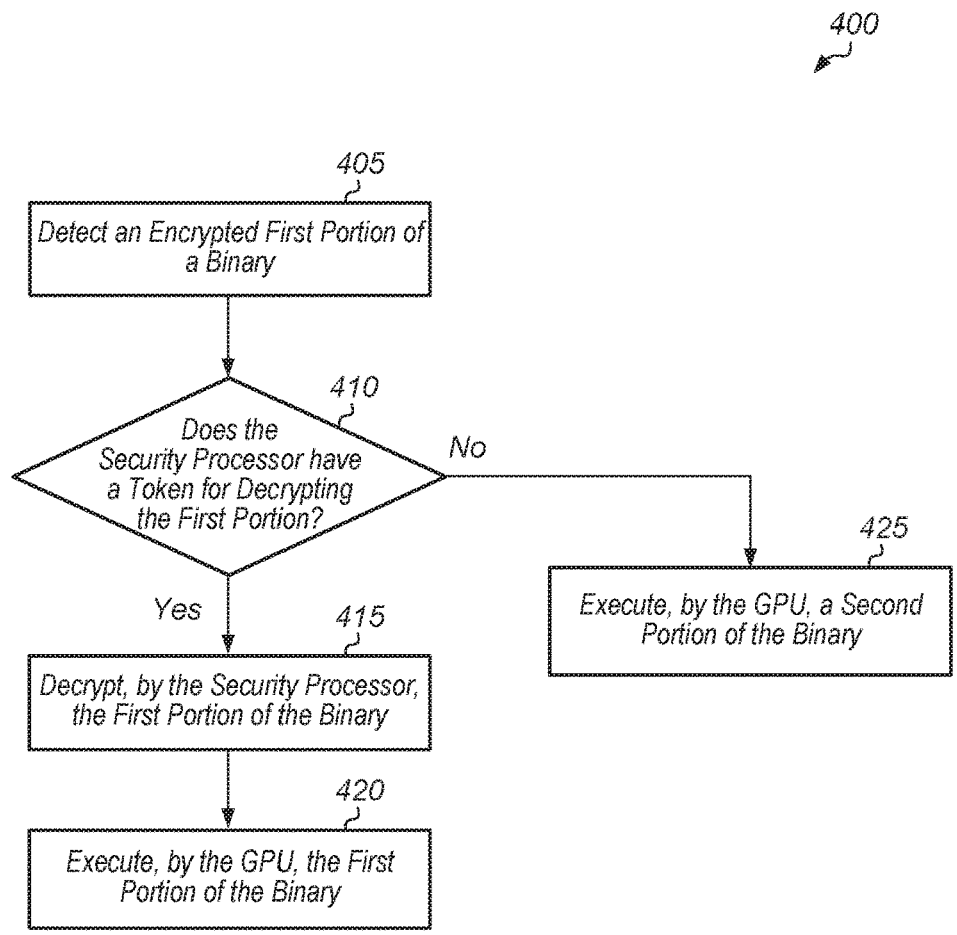
FIG. 4 is a generalized flow diagram illustrating one embodiment of a method for determining which content to execute.
Figure 5:
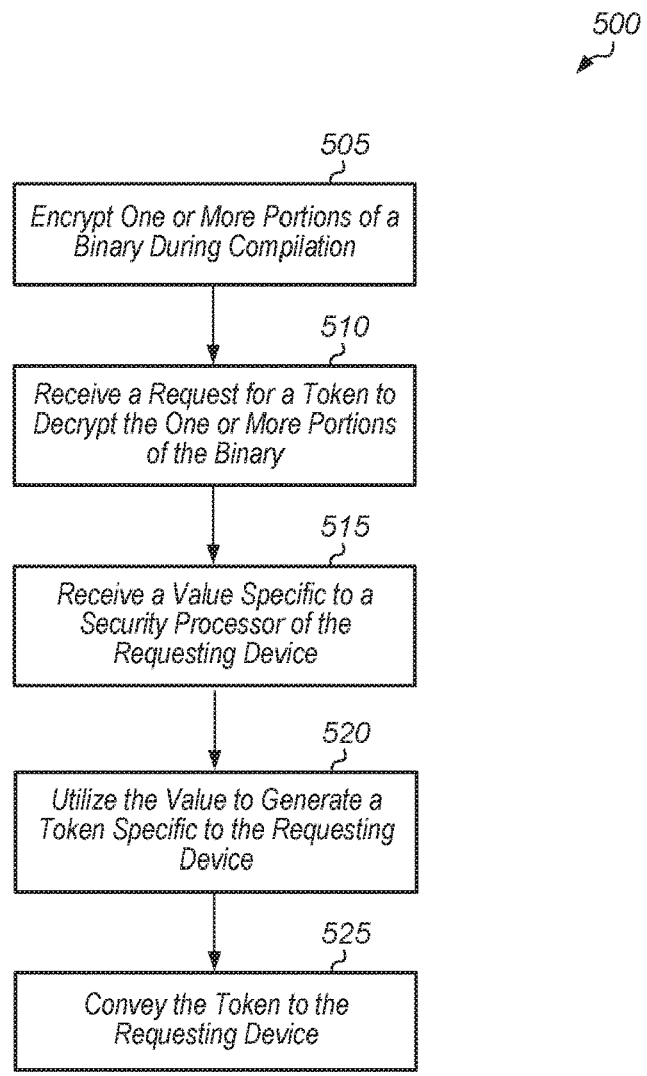
FIG. 5 is a generalized flow diagram illustrating one embodiment of a method for generating a token.
Figure 6:
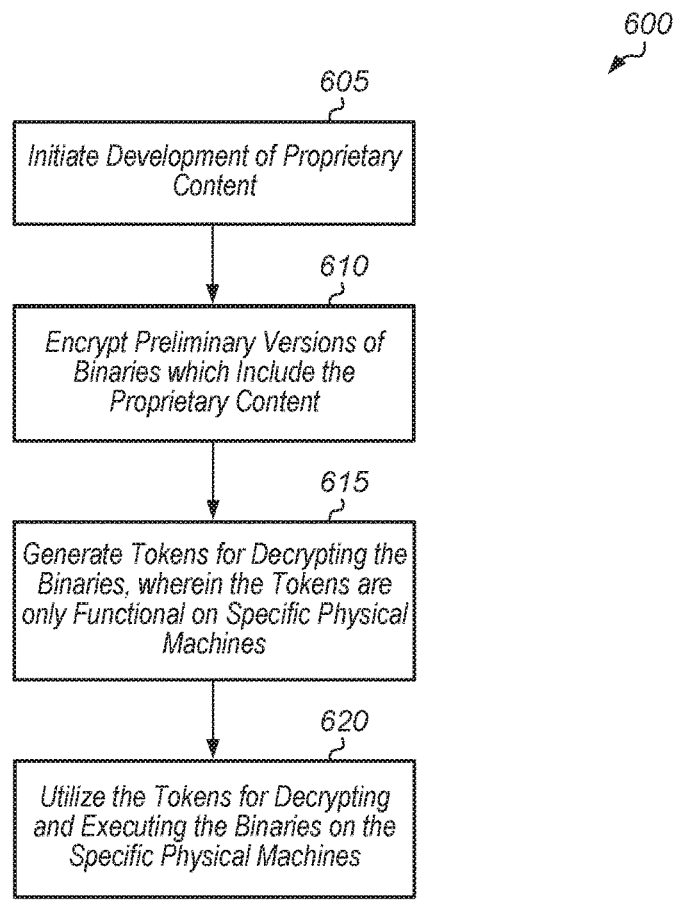
FIG. 6 is a generalized flow diagram illustrating one embodiment of a method for protecting proprietary content.

Referring now to FIG. 3, one embodiment of a method 300 for implementing digital rights management using a GPU is shown. For purposes of discussion, the steps in this embodiment and those of FIGS. 4-6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

A first processor of a computing system executes a first portion of a binary (block 305). The first processor detects that a second portion of the binary is encrypted (block 310). A second processor of the computing system retrieves a token specific to the second processor (block 315). The second processor decrypts the second portion of the binary using the token (block 320). In one embodiment, the second processor generates a key based on the token, and then the second processor decrypts the second portion using the key. Then, after decrypting the second portion of the binary, the second processor stores the decrypted second portion at a memory location accessible by the first processor (block 325). Next, the first processor executes the second portion of the binary (block 330). After block 330, method 300 ends.

Turning now to FIG. 4, one embodiment of a method 400 for determining which content to execute is shown. A system detects an encrypted first portion of a binary (block 405). Next, the system determines if a security processor has a token for decrypting the first portion of the binary (conditional block 410). If the security processor has the token for decrypting the first portion of the binary (conditional block 410, "yes" leg), then the security processor decrypts the first portion of the binary (block 415). Next, a GPU of the system executes the first portion of the binary (block 420). If the security processor does not have the token for decrypting the first portion of the binary (conditional block 410, "no" leg), then the GPU executes a second portion of the binary (block 425). In one embodiment, the first portion of the binary includes a first plurality of textures and the second portion of the binary includes a second plurality of textures, where the first plurality of textures are at a higher resolution than the second plurality of textures. For example, in one embodiment, the binary is a game, and if the user of the system purchases the token for decrypting the first portion of the binary, then the game includes enhanced content (e.g., higher quality graphics). If the user of the system does not purchase the token, then the user can still play the game but with lower quality graphics. After blocks 420 and 425, method 400 ends.

Referring now to FIG. 5, one embodiment of a method 500 for generating a token is shown. A compiler is configured to encrypt one or more portions of a binary during compilation (block 505). In one embodiment, the binary corresponds to a video game. Next, a license server receives a request for a token to decrypt the one or more portions of the binary (block 510). The request also includes payment information for purchasing the exclusive content in the one or more encrypted portions of the binary. In one embodiment, the license server also receives a value specific to a security processor of the requesting device (block 515). Next, the license server utilizes the value to generate a token specific to the requesting device (block 520). Then, the license server conveys the token to the requesting device (block 525). After block 525, method 500 ends.

Turning now to FIG. 6, one embodiment of a method 600 for protecting proprietary content is shown. A company or organization initiates the development of proprietary content (block 605). For example, in one embodiment, a game developer initiates development of a video game in block 605. Next, a computing system encrypts preliminary versions of binaries which include the proprietary content (block 610). Next, the system generates tokens for decrypting the binaries, wherein the tokens are only functional on specific physical machines (block 615).

For example, in one embodiment, the tokens are generated for computers and servers that are located within a company's local network. In one embodiment, each of these computers and servers include a security processor, and the tokens are generated to work only with these specific security processors. Accordingly, the tokens for decrypting the binaries prevent the binaries from being executed on computers external to the company and prevent leakage of information associated with any pre-release binaries. In another embodiment, the tokens are generated to be functional only on specific types of processors. For example, a game developer can target a game to a specific type of GPU, and then tokens are generated to work only with this specific type of GPU. In other embodiments, other techniques for generated tokens targeted to specific machines, either based on a location, a host company or organization, a specific processor type, a specific user, and/or other factors, are possible and are contemplated.

After block 615, the specific physical machines utilize the tokens for decrypting and executing the binaries (block 620). The company can then perform pre-release testing of the binaries on these approved machines without the risk of content being exposed if someone outside of the company gains unauthorized access to the binaries. After block 620, method 600 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a first processor; and
a second processor, wherein the second processor is a security processor;
a memory;
wherein the system is configured to:
 execute a first portion of a binary on the first processor;
 detect that a second portion of the binary is encrypted, wherein the second portion of the binary is stored in the memory;
 retrieve a token specific to the second processor, wherein the token is usable to decrypt the second portion of the binary by only the second processor;
 decrypt, by the second processor, the second portion of the binary with the token; and
 execute, on the first processor, the second portion of the binary.

2. The system as recited in claim 1, wherein:
the first processor is configured to specify a memory address for the second processor to store the second portion of the binary subsequent to decryption; and
the second processor is configured to store the second portion of the binary at the memory address subsequent to decryption.

3. The system as recited in claim 1, wherein responsive to determining the second processor does not have the token for decrypting the second portion of the binary, the first processor is configured to execute a third portion of the binary.

4. The system as recited in claim 3, wherein the second portion comprises a first plurality of textures, wherein the third portion comprises a second plurality of textures, and wherein the first plurality of textures are at a higher resolution than the second plurality of textures.

5. The system as recited in claim 1, wherein the system further comprises a third processor, and wherein the binary is conveyed from the third processor to the first processor.

6. The system as recited in claim 5, wherein:
the first processor is a graphics processing unit (GPU); and
the third processor is a central processing unit (CPU).

7. The system as recited in claim 1, wherein the system is further configured to:
send a request to a license server, wherein the request comprises a value specific to the second processor; and
receive the token from the license server, wherein the token is generated based on the value specific to the second processor.

8. A method comprising:
executing a first portion of a binary on a first processor;
detecting that a second portion of the binary is encrypted;
retrieving a token specific to a second processor, wherein the second processor is a security processor, wherein the token is usable to decrypt the second portion of the binary by only the second processor; and
decrypting, by the second processor, the second portion of the binary with the token; and
executing, on the first processor, the second portion of the binary.

9. The method as recited in claim 8, further comprising:
specifying, by the first processor, a memory address for the second processor to store the second portion of the binary subsequent to decryption; and
storing, by the second processor, the second portion of the binary at the memory address subsequent to decryption.

10. The method as recited in claim 8, wherein responsive to determining the second processor does not have the token for decrypting the second portion of the binary, the method further comprising executing a third portion of the binary.

11. The method as recited in claim 10, wherein the second portion comprises a first plurality of textures, wherein the third portion comprises a second plurality of textures, and wherein the first plurality of textures are at a higher resolution than the second plurality of textures.

12. The method as recited in claim 8, further comprising conveying the binary from a third processor to the first processor.

13. The method as recited in claim 12, wherein:
the first processor is a graphics processing unit (GPU); and
the third processor is a central processing unit (CPU).

14. The method as recited in claim 8, further comprising:
sending a request to a license server, wherein the request comprises a value specific to the second processor; and
receiving the token from the license server, wherein generating the token is based on the value specific to the second processor.

15. A non-transitory computer readable storage medium storing program instructions, wherein the program instructions are executable by a processor to:
execute a first portion of a binary on a first processor;
detect that a second portion of the binary is encrypted;
retrieve a token specific to a second processor, wherein the second processor is a security processor, wherein the token is usable to decrypt the second portion of the binary by only the second processor;
decrypt, by the second processor, the second portion of the binary with the token; and execute, on the first processor, the second portion of the binary.

16. The non-transitory computer readable storage medium as recited in claim 15, wherein the program instructions are further executable by a processor to:
    specify, by the first processor, a memory address for the second processor to store the second portion of the binary subsequent to decryption; and
    store, by the second processor, the second portion of the binary at the memory address subsequent to decryption.

17. The non-transitory computer readable storage medium as recited in claim 15, wherein responsive to determining the second processor does not have the token for decrypting the second portion of the binary, the program instructions are further executable by the first processor to execute a third portion of the binary.

18. The non-transitory computer readable storage medium as recited in claim 17, wherein the second portion comprises a first plurality of textures, wherein the third portion comprises a second plurality of textures, and wherein the first plurality of textures are at a higher resolution than the second plurality of textures.

19. The non-transitory computer readable storage medium as recited in claim 15, wherein the program instructions are further executable by a third processor to convey the binary to the first processor.

20. The non-transitory computer readable storage medium as recited in claim 15, wherein the program instructions are further executable by a processor to:
    send a request to a license server, wherein the request comprises a value specific to the second processor; and
    receive the token from the license server, wherein the token is generated based on the value specific to the second processor.

\* \* \* \* \*